United States Patent Office 3,230,207
Patented Jan. 18, 1966

3,230,207
PROCESS FOR POLYMERIZING OLEFIN OXIDES WITH A CATALYST CONSISTING OF A ZINC ALKYL AND AN OXIDE OR HYDROXIDE OF A GROUP IIA METAL
Hiroshi Daimon, Kosaku Kamio, and Shimpei Kojima, Toyama-ken, Japan, assignors to Nippon Carbide Kogyo Kabushiki Kaisha, Chiyoda-ku, Tokyo, Japan, a corporation of Japan
No Drawing. Original application Mar. 1, 1961, Ser. No. 92,458. Divided and this application Sept. 28, 1962, Ser. No. 227,086
Claims priority, application Japan, Mar. 5, 1960, 35/7,344
4 Claims. (Cl. 260—88.3)

This application is a division of our copending application No. 92,458.

This invention relates to the preparation of homopolymers and copolymers of olefin oxides. More particularly, this invention relates to the preparation of these polymers by homopolymerizing or copolymerizing olefin oxides in the presence of a catalyst system consisting of an organozinc compound and a specific cocatalyst.

The term "polymers" as used in this application means homopolymers and copolymers; the term "to polymerize" means to homopolymerize and to copolymerize; the term "olefin oxides" means compounds having at least one epoxy group in the molecule.

Olefin oxides have previously been polymerized in the presence of an organozinc compound which acts as a catalyst. However, when the polymerization of olefin oxides is effected with only an organozinc compound being used as the catalyst, the yield of polymers is very low. Additionally, the polymers produced by this polymerization have a low molecular weight and low crystallinity. Further, when the olefin oxides to be polymerized are olefin oxides containing not less than three carbon atoms in the molecule, polymerization in the presence of an organozinc compound gives very poor results.

It is an object of this invention to provide for polymerizing olefin oxides into high molecular weight polymers with excellent yields.

It is a further object of the invention to produce olefin oxide polymers having a degree of crystallization suitable for desired applications.

It is a further object of the invention to produce olefin oxide polymers having high crystallinity which was difficult to obtain heretofore.

It is still a further object of the invention to produce stable olefin oxide polymers.

It is yet a further object of the invention to produce olefin oxide polymers having olefinic double bonds and having no cross linkage in the molecule.

Other objects of this invention will become apparent from the following detailed description.

The olefin oxides which can be homopolymerized or copolymerized according to this invention include ethylene oxide, propylene oxide, butene oxide, isobutene oxide, epichlorohydrin, epibromohydrin, trifluoromethyl ethylene oxide, cyclohexene oxide, phenylglycidyl ether, butadiene oxide, butadiene dioxide and styrene oxide.

We have found that a catalyst system consisting of at least one material selected from the following class (A) and at least one material selected from the following class (B) is effective for the polymerization of olefin oxides:

(A) Dialkyl zinc having the general formula

R—Zn—R' wherein R and R' represent hydrocarbon radicals having not more than 4 carbon atoms.

(B) Metal oxides and metal hydroxides of metals belonging to the IIa group in the Periodic Table.

The compounds of the class (A) include dimethylzinc, diethylzinc and dibutylzinc.

The metal oxides include magnesium oxide, calcium oxide, strontium oxide and barium oxide.

The metal hydroxides include calcium hydroxide, strontium hydroxide and barium hydroxide.

The mechanism by which the compounds belonging to the class (B) remarkably increase the catalytic activity of organozinc compounds belonging to the class (A) has not yet been clarified. However, in view of the results of an enormous number of polymerization experiments, it is believed that the polymerization activity of said organozinc compounds is enhanced by a change of electron state caused by coordination of atoms having large electronegativity value in the compounds belonging to the class (B).

The effect of use of both compounds belonging to class (A) and class (B) together as compared with the effect of the use of each of them separately appears from the following:

Polymerization of propylene oxide in a closed tub at 80° C. for 18 hours in the presence of diethylzinc of class (A) as the sole catalyst gives only a liquid low molecular weight polymer. High polymers are not obtained under the same conditions in the presence of a compound belonging to class (B) used as the sole catalyst. On the contrary, the polymerization of propylene oxide at 80° C. for 18 hours in the presence of a catalyst system consisting of compounds belonging to both classes (A) and (B) gives a high polymer of propylene oxide with a good yield. The molecular weight of polymers thus obtained amounts to several millions and the polymers are of high crystallinity.

Further, properties can be improved by forming secondary crosslinkages between olefin oxide polymer molecules to produce very useful synthetic resins or synthetic rubbers.

There are various methods to form crosslinkages between olefin oxide polymer molecules. According to one of those methods, an olefin oxide having an olefinic unsaturated bond is homopolymerized or copolymerized to introduce the olefinic unsaturated bond into the polymer and the crosslinking reaction is effected on molding. Sometimes the unsaturated bond of the olefin oxide having the olefinic unsaturated bond reacts during the polymerization to give a cross linked olefin oxide polymer.

In the method of this invention compounds belonging to classes (A) and (B) react with each other in an optional method and form active catalysts. They can, however, be used merely by simply mixing both of them together. A compound belonging to the class (B) can, for example, be dispersed in a suitable inert organic solvent such as, for example, ether, hexane, toluene, etc., and an organozinc compound is added thereto. Immediately after the reaction, the mixture can be used. Also, the mixture may be allowed to stand at room temperature for an extended period of time in order to allow the completion of the reaction or the mixture can be subjected to a heat treatment and then used.

The ratio of the compound of the class (A) to the compound of the class (B) can be 1 part:0.001–10,000 parts and is preferably 1 part:0.01–10 parts; it need not be an integer ratio stoichiometrically.

In the polymerization of this invention, the amount of polymerization catalyst is not particularly limited, but in general the amount of the organozinc compound to the monomer ranges from 0.001 mol percent to 10 mol percent and preferably from 1 mol percent to 5 mol percent.

The polymerization method of this invention can be carried out with a wide range of temperatures, particularly from −20° C. to 300° C. and preferably from 0° C. to 200° C.

In the method of this invention, it is preferable to use a diluent, because it facilitates the polymerization operation. As the diluent, inert solvents are generally used for the monomer. Among the usable inert solvents are: ethers such as diethyl ether, diisopropyl ether and the like, aromatic hydrocarbons such as benzene, toluene and the like, aliphatic or cycloaliphatic hydrocarbons such as n-hexane, n-heptane, cyclohexane, petroleum ether, petroleum benzene and the like, and halogenated hydrocarbons such as chloroabenzene, methylene chloride, chloroform, carbon tetrachloride and the like. Also, these can be used as mixtures.

In the following examples all parts and percents are based on weight unless otherwise specified.

*Example 1*

Air in a stainless steel vessel of 100 ml. volume was replaced with nitrogen. Magnesium oxide (2 mol percent to propylene oxide) pulverized in 10 parts of n-hexane and n-hexane solution containing 0.3 part of diethylzinc were added to the stainless steel vessel. After several minutes, 10 parts of propylene oxide were added and the vessel was closed and placed under thermostat control at 80° C. After 18 hours the vessel was cooled, and the resulting polymer product was taken out and dried under vacuum. 10.5 parts of white crude polymer product was obtained.

*Examples 2–4*

In these examples, the following compounds were used as the cocatalysts in place of magnesium oxide in Example 1. The amount of cocatalyst of 2 mol percent to propylene oxide used. The value of polymer yield is calculated from the amount of dried polymer product less the amount of catalyst contained therein.

| Example | Cocatalyst | Polymer yield (percent) |
|---|---|---|
| 2 | Calcium hydroxide | 84 |
| 3 | Strontium oxide | 100 |
| 4 | Barium oxide | 100 |

What is claimed is:

1. A method for the preparation of polymers of olefin oxides comprising polymerizing an olefin oxide having less than 10 carbon atoms and consisting of atoms selected from the group consisting of H, C, O and halogens at 0 to 200° C., in the presence of a catalyst system consisting of 0.001–10 mol percent based on the monomer, of a material of a class (A) of dialkyl zinc having the general formula of R—Zn—R' wherein R and R' are hydrocarbon radicals having not more than 4 carbon atoms and 0.001–10,000 parts by weight based on the material of class (A), of a material of a class (B) selected from the group consisting of metal oxides and metal hydroxides of the metals belonging to the IIa group in the Periodic Table.

2. A method according to claim 1 wherein the olefin oxide is ethylene oxide.

3. A method according to claim 1 wherein the olefin oxide is propylene oxide.

4. A method according to claim 1 wherein the olefin oxide is butadiene monoxide which is polymerized into a solid polymer.

References Cited by the Examiner

UNITED STATES PATENTS 2,870,101  1/1950  Stewart _____ 260—2
3,031,439  4/1962  Bailey _____ 260—88.3

OTHER REFERENCES

Burukawa et al.: Japan, 13,446 (1961), CA 56, p. 118103 (1962).

Furukawa et al.: Makromol Chem. 32, 90–92 (1959).

Furukawa et al.: Makromol. Chem. 36, No. 1, pp. 25–39 (1959).

JOSEPH L. SCHOFER, *Primary Examiner.*

WILLIAM H. SHORT, *Examiner.*

W. G. GOODSON, W. HOOVER, *Assistant Examiners.*